Aug. 17, 1948.  D. W. STABLER  2,447,039
EGG BOILER
Filed Jan. 3, 1944
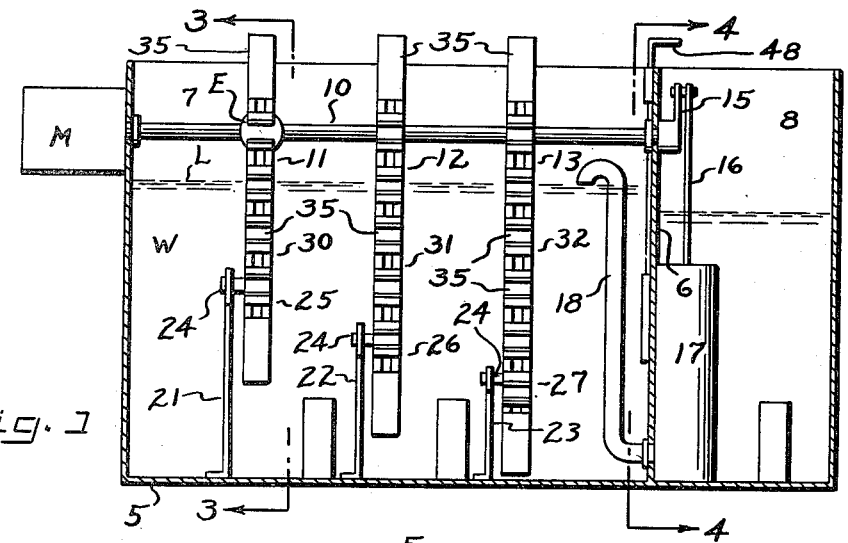
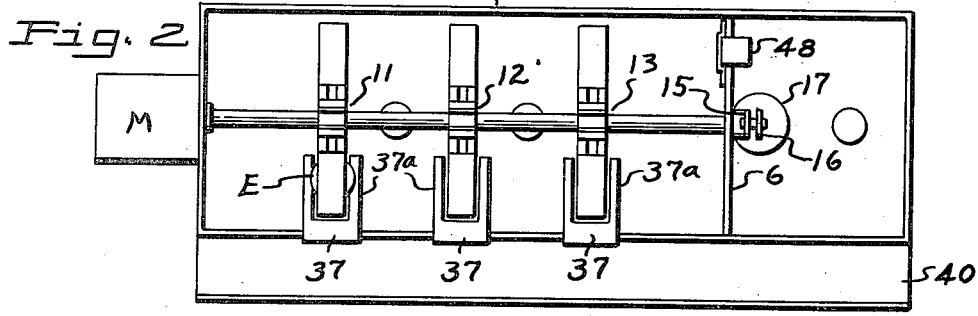
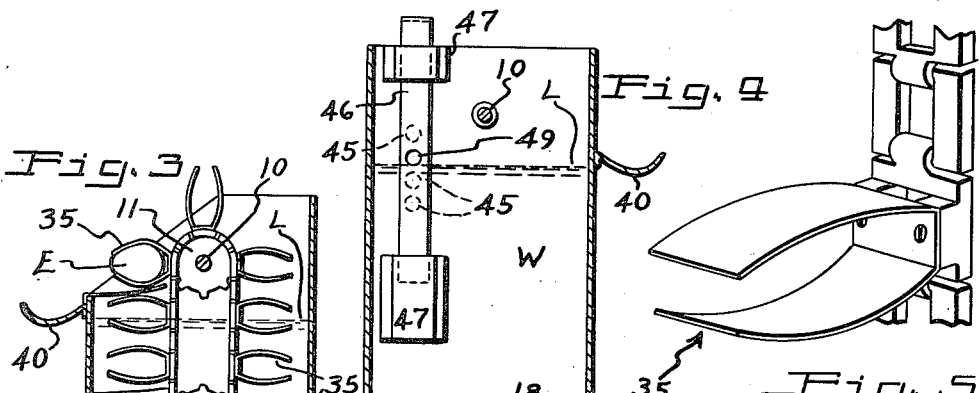
Inventor
Dwight W. Stabler
By
Atty.

Patented Aug. 17, 1948

2,447,039

UNITED STATES PATENT OFFICE 2,447,039

EGG BOILER

Dwight W. Stabler, Venice, Calif.

Application January 3, 1944, Serial No. 516,887

2 Claims. (Cl. 99—404)

This invention has to do with an automatic egg boiling device.

It has as an object the provision of a device capable of accomplishing automatic boiling of eggs for any desired predetermined period.

It is another object to provide novel and efficient means incorporated in a single boiler for simultaneously boiling eggs for different predetermined periods of time.

Another object is to provide novel means for maintaining a uniform predetermined liquid level in the boiler regardless of the rate of evaporation.

Another object is the provision of an automatic stripper for removing the eggs from the conveyor after the same are cooked.

Other objects and advantages are inherent in the invention and how those as well as the above-mentioned objects are achieved will be best understood from the following detailed description of one of the physical forms which my invention may take, it being understood, of course, that the invention, in its broader aspects, is susceptible of other adaptations and embodiments. For purposes of the following description I shall refer to the accompanying drawings, in which:

Fig. 1 is a medial section;

Fig. 2 is a top plan view;

Fig. 3 is a section on line 3—3 of Fig. 1;

Fig. 4 is a section on line 4—4 of Fig. 1; and

Fig. 5 is an enlarged fragmentary perspective of the conveyor belt and one of the egg-retaining clamps.

In the drawings I show at 5 a tank adapted to contain a boiling liquid such as water W, the liquid level in the tank being denoted by the letter L. A partition wall 6 divides the tank into a cooking chamber 7 and a storage chamber or reservoir 8, the water in both chambers being heated as by electrical heating elements 9, although other heating means may be employed.

Journaled at one end in an end wall of the tank and at its other end in the division wall 6, there is a drive shaft 10 to the outer end of which a motor M is operatively connected. Sprocket wheels 11, 12 and 13 are secured on the shaft 10 at points spaced apart therealong and a crank 15 is secured on the inner end of the shaft, to which crank the connecting rod 16 of a conventional plunger pump 17 is pivotally connected, the pump thus being operated by rotation of the shaft 10 to pump water from reservoir 8 into the cooking chamber 7 through pipe 18 at all times during rotation of the shaft.

Brackets 21, 22, 23 are secured to the floor of the tank in chamber 7, each of the brackets carrying a spindle 24 upon which sprockets 25, 26, 27 respectively are rotatably mounted. It will be observed that the respective brackets 25, 26, 27 are of different heights so that the axes of the respective spindles 24 are spaced differently from the axis of shaft 10.

Continuous, link conveyor belts 30, 31, 32 are disposed respectively on the respective sprocket pairs—that is, belt 30 is mounted on sprockets 11, 25; belt 31 is mounted on sprockets 12, 26; and belt 32 is mounted on sprockets 13, 27. Because of the different heights of the brackets 20, 21, 22, the respective belts are of relatively different lengths. The sprockets being rotated simultaneously by a common drive shaft, the belts therefore require different periods for travel through the heated liquid in the tank.

As best shown in Figs. 3 and 4, there are secured to the belt links resilient egg-retaining clamps 35, between the two resilient arms to each of which an egg E may be clamped.

Stationarily secured to the top edge of the front wall of the tank at points opposite the respective belts, I provide three strippers 37, which are U-shaped, presenting spaced resilient parallel arms 37a, between which arms the clamps 35 travel during movement of the belts by the sprockets. Said arms 37a are spaced apart a sufficient distance to pass the belt links with their carried clamps, but are not spaced far enough apart to pass the ends of an egg carried by any clamp, so that as the belt moves a carried egg against the resilient arms 37a, the top arm of the clamp 35 will yield and permit the egg to be stripped from the clamp, after which it will drop over the top edge of the tank onto the trough 40 secured to the front wall of the tank adjacent its front edge.

For instance, eggs to be boiled a relatively short period of time—say, two minutes—are placed on clamps carried by the short belt 30, the speed of the motor and the length of the belt being so proportioned that it will require the desired predetermined period for the egg-carrying clamp to be moved through the boiling water in the tank. The three conveyor belts 30, 31, 32 are of identical construction and differ only as to length.

For adjustment of the water level I provide a plurality of vertically alined holes 45 in the partition wall 6 over which I provide a slidable plate 46 held in close contact with the wall 6 as by plates 47, the top end of the slidable plate being bent at right angle as shown at 48, to provide a finger grip for manual operation. Only a single hole 49 is provided through the slidable plate 47 so that the single hole 49 may be brought into register with any one of the holes 45 by sliding the plate upwardly or downwardly. The pump 17 is continuously operated while the shaft 10 is being rotated by the motor, so that water is being constantly pumped from reservoir 8 into the boiling or cooking chamber 7 and any water thus pumped into the chamber 7 in excess of that required to maintain the liquid level L for which the slidable plate 46 is set, will by gravity flow back into the reservoir through the registering holes 49 and 45.

In operation, if it be desired to simultaneously boil eggs for different periods—say, two, three and four minutes, respectively—the eggs are placed in clamps 35 carried by the three belts 30, 31, 32, which can be done while the motor is in operation, if desired. The motor then rotates the shaft 10 to move the belts and carried eggs downwardly through the boiling water W, thence upwardly therefrom until the respective eggs contact the respective stripper arms 37a, which latter act to strip the eggs from the clamps permitting them to drop into the trough 40 from which they may be picked up for serving.

My invention, of course, contemplates that the number of belts and their respective lengths may be increased or decreased as desired for a given unit.

While in the foregoing, I have resorted to considerable detail of structure and association of parts in describing a particular example of my invention, I wish it to be understood that I have done so merely to make my invention understood and that I do not limit my invention to such details. On the contrary, my invention is only to be limited as appears in the appended claims.

I claim:

1. An egg boiler comprising, in combination, a tank presenting a cooking chamber adapted to contain heated liquid and a liquid reservoir open to atmosphere, a pair of belt-rotating members one mounted to rotate about a horizontal axis in the cooking chamber below the level of liquid therein and the other mounted to rotate about a horizontal axis in said chamber directly above the other belt-rotating member and above the liquid level in said chamber, a continuous conveyor belt carried by said members, means for rotating one of said members, an egg-retaining member on the belt, means for heating the liquid in the cooking chamber, and liquid level maintaining means communicating between the reservoir and cooking chamber, the last-named means comprising a pump operatively connected to said means for rotating one of the belt rotating members.

2. An egg boiler comprising, in combination, a tank presenting a cooking chamber adapted to contain heated liquid and a liquid reservoir open to atmosphere, a pair of belt-rotating members one mounted to rotate about a horizontal axis in the cooking chamber below the level of liquid therein and the other mounted to rotate about a horizontal axis in said chamber directly above the other belt-rotating member and above the liquid level in said chamber, a continuous conveyor belt carried by said members, means for rotating one of said members, an egg-retaining member on the belt, means for heating the liquid in the cooking chamber, liquid level maintaining means communicating between the reservoir and cooking chamber, the last-named means comprising a pump operatively connected to said means for rotating one of the belt rotating members, and adjustable means for returning to the reservoir excess liquid in the cooking chamber.

DWIGHT W. STABLER.

REFERENCES CITED

The following references are of record in the file of this patent:

UNITED STATES PATENTS

| Number | Name | Date |
| --- | --- | --- |
| 437,706 | Mathias | Oct. 7, 1890 |
| 1,159,537 | Shields | Nov. 9, 1915 |
| 1,580,684 | Scheidigger | Apr. 13, 1926 |
| 1,741,982 | Ehmann | Dec. 31, 1929 |
| 1,942,132 | Blim et al. | Jan. 2, 1934 |
| 2,229,167 | Carpenter | Jan. 21, 1941 |
| 2,287,396 | Roth | June 23, 1942 |

FOREIGN PATENTS

| Number | Country | Date |
| --- | --- | --- |
| 331,831 | Great Britain | July 8, 1930 |